United States Patent
Berenyi nee Poldermann et al.

[11] 3,873,543
[45] Mar. 25, 1975

[54] 3-SUBSTITUTED-AS-TRIAZINO(5,6-C) QUINOLINE DERIVATIVES

[75] Inventors: Edit Berenyi nee Poldermann; Laszlo Pallos; Pal Benko; Lujza E. Petocz; Peter Gorog; Zoltan Budai; Eniko Kiszelly, all of Budapest, Hungary

[73] Assignee: EGYT Gyogyszervegyeszeti Gyar, Budapest, Hungary

[22] Filed: May 7, 1973

[21] Appl. No.: 357,722

[30] Foreign Application Priority Data
May 5, 1972 Hungary............................ EE2022

[52] U.S. Cl......... 260/248 AS, 424/249, 260/287 R
[51] Int. Cl............................................. C07d 57/34
[58] Field of Search............................. 260/248 AS

[56] References Cited
UNITED STATES PATENTS
3,597,427   8/1971   Lewis................................. 260/248

Primary Examiner—John M. Ford
Attorney, Agent, or Firm—Young & Thompson

[57] ABSTRACT

New 3-substituted as-triazino[5,6-c]quinoline derivatives of the general formula (I)

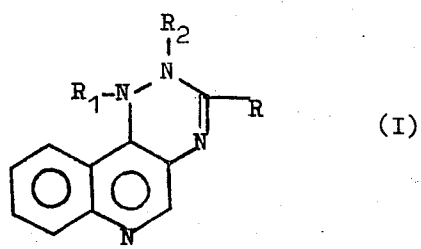

wherein
R represents hydrogen, a $C_{1-4}$ alkyl group, an aralkyl group containing 1 to 4 carbon atoms in the alkyl chain, pyridyl, or a phenyl group optionally substituted with a halogen, nitro, hydroxy or amino group,
$R_1$ and $R_2$ each represent hydrogen, or form together a chemical bond
are prepared as follows:
4-chloro-3-nitroquinoline is reacted with a carboxylic hydazide of the general formula (II)

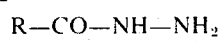

or 4-hydrazino-3-nitroquinoline is reacted with a carboxylic halide of the general formula (IIa)

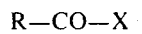

wherein X represents a halogen atom-, the thus-obtained 4-acylhydrazino-3-nitroquinoline of the general formula (III)

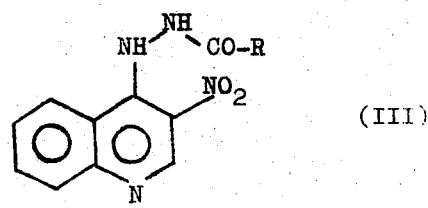

is reduced, the thus-obtained 4-acylhydrazino-3-aminoquinoline of the general formula (IV)

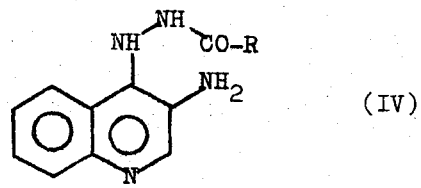

is subjected to ring closure in an acidic medium, and the formed 1,2-dihydro-as-triazino[5,6-c]quinoline is isolated in the form of its acid addition salt, or oxidized into the corresponding as-triazino[5,6-c]quinoline, if desired.

The new compounds of the general formula (I) possess anti-inflammatory and antimicrobial activities.

1 Claim, No Drawings

3-SUBSTITUTED-AS-TRIAZINO(5,6-C) QUINOLINE DERIVATIVES

This invention relates to novel 3-substituted-as-triazino[5,6-c]quinoline derivatives of anti-inflammatory and antimicrobial activities.

The compounds according to the invention correspond to the general formula (I)

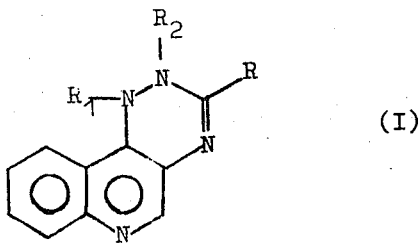

wherein
R represents hydrogen, $C_{1-4}$ alkyl group, and aralkyl group containing 1 to 4 carbon atoms in the alkyl chain, pyridyl, or a phenyl group optionally substituted with a halogen, nitro, hydroxy or amino group,
$R_1$ and $R_2$ each represent hydrogen, or form together a chemical bond.

These compounds are of basic character and form addition salts with acids. The scope of the invention encompasses also the acid addition salts of the new quinoline derivatives, as well as the processes for the preparation of such salts.

The new compounds of the general formula (I) can be prepared as follows: 4-chloro-3-nitroquinoline is reacted with a carboxylic hydrazide of the general formula (II)

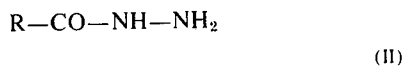

or 4-hydrazino-3-nitroquinoline is reacted with a carboxylic halide of the general formula (IIa)

in the above formulae R has the same meanings as defined above and X represents a halogen atom — the thus-obtained 4-acylhydrazino-3-nitroquinoline of the general formula (III)

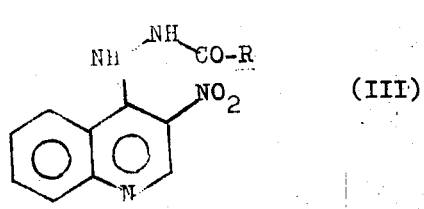

wherein R has the same meanings as defined above — is reduced, the thus-obtained 4-acylhydrazino-3-amino-quinoline of the general formula (IV)

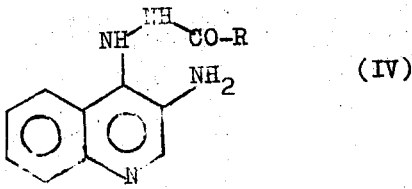

wherein R has the same meanings as defined above — is subjected to ring closure in an acidic medium, and the formed 1,2-dihydro-as-triazino[5,6-c]quinoline is isolated in the form of its acid addition salt, or oxidized into the corresponding 3-substituted-as-triazino[5,6-c]quinoline, if desired.

4-Chloro-3-nitroquinoline can be reacted with the respective carboxylic hydrazide in equimolar amounts in an alcoholic medium to yield the hydrochloride of the respective 4-acylhydrazino-3-nitroquinoline. These hydrochlorides hydrolyze very easily. The carboxylic hydrazide, however, can also be used in excessive amounts to yield the free base of the general formula (III). Either the free bases of the general formula (III), or their acid addition salts can be converted into the respective 3-aminoquinoline derivatives with good yields by treating them with hydrogen in a solvent medium in the presence of a hydrogenating catalyst.

The ring closure of the 3-amino-compounds is accomplished upon the action of an acid, such as hydrochloric, polyphosphoric, etc. acid. When carrying out the ring closure in ethanolic hydrochloric acid, the respective 3-substituted-1,2-dihydro-as-triazino[5,6-c]quinoline is obtained in the form of its hydrochloride, which generally separates from the reaction mixture. The hydrochloride of the dihydro compound can optionally be oxidized into the corresponding aromatic compound of the general formula (I). The oxidation is preferably carried out in alkaline medium in the presence of hexacyanoferrate ions.

According to the pharmacological examinations the compounds of the general formula (I) possess anti-inflammatory and antimicrobial activities. The anti-inflammatory activity of the new compounds was investigated on rats by the carrageenin-oedema test, using the method of Winter et al. (J. Pharmacol. Exp. Ther. 141, 369 /1963/). Male rats weighing 150 to 180 g. were used as test animals. 0.1 ml. doses of carrageenin-suspension were injected subcutaneously into the hind paws of the animals, and the thus-provoked oedema was measured by plethysmometer. The compound to be tested were administered orally in the doses as indicated in Table 1. The percentage inhibition was calculated by comparing the measures of oedema of the tested animals to that of the controls.

The results of the above test are summarized in Table 1.

TABLE 1

| Tested compound | Dosis mg./kg. | Inhibition % | $LD_{50}$ mg./kg. |
|---|---|---|---|
| 3-phenyl-1,2-dihydro-as-triazino[5,6-c]quinoline | 200.00 | 23.3 | >3000 |
|  | 400.00 | 31.8 |  |
| 3-phenyl-as-triazino-[5,6-c]quinoline | 200.00 | 15.7 | ~3000 |
|  | 400.00 | 20.3 |  |
| 3-(3',4',5'-trimethoxyphenyl)-astriazino-[5,6-c]quinoline | 200.00 | 33.8 | ~3000 |
| 3-(3',4'-dimethoxyphenyl) |  |  |  |

TABLE 1-Continued

| Tested compound | Dosis mg./kg. | Inhibition % | LD$_{50}$ mg./kg. |
|---|---|---|---|
| as-triazino[5,6-c]quinoline | 200.00 | 38.6 | >3000 |
| 3-benzyl-as-triazino-[5,6-c]quinoline | 200.00 | 32.6 | >3000 |
| 3-(4'-pyridyl)-as-triazino[5,6-c]quinoline | 20.0 | 12.9 | |
| | 40.0 | 34.1 | 1000 |
| | 80.0 | 56.2 | |
| as-triazino[5,6-c]quinoline | 0.87 | 24.3 | |
| | 1.75 | 32.8 | 90 |
| | 3.5 | 43.5 | |
| Aspirin | 180.00 | 39.0 | 1500 |
| Phenylbutazon | 30.0 | 33.0 | 1000 |
| | 90.0 | 45.0 | |
| Indomethacine | 3.0 | 30.0 | 24.3 |
| | 9.0 | 44.0 | |

The compounds of the invention can be transformed to pharmaceutical products by admixing them with carriers and/or auxiliary agents usable in the pharmaceutical industry. The pharmaceutical preparations may contain other biologically active and/or synergistic agents besides the compound of the general formula (I).

The invention is elucidated in detail by the aid of the following non-limiting Examples.

EXAMPLE 1

1-β-Benzhydrazino-3-nitroquinoline 13.6 g. (0.1 mol.) of benzoic hydrazide are dissolved in 200 ml. of ethanol, and 20.8 g. (0.1 mol.) of 4-chloro-3-nitroquinoline are added to the stirred solution at a temperature of 30° to 40 °C. A dark red suspension is obtained, which gradually turns yellow. After 3 hours of stirring the separated light yellow, crystalline substance is filtered off and dried. 31.6 g. (92 %) of 4-β-benzhydrazino-3-nitroquinoline hydrochloride are obtained; m.p.: 244°–246 °C.

The obtained salt is suspended in tenfold amount of water, and the base is liberated by adding equimolar amount of Na$_2$CO$_3$ to the solution. The dark purple 4-β-benzhydrazino-3-nitroquinoline base melts at 202°–203 °C after recrystallization from nitrobenzene.

EXAMPLE 2

4-β-Phenylhydrazino-3-nitroquinoline 30.0 g. (0.2 mol.) of phenylacetic hydrazide are dissolved in tenfold amount of ethanol, and 20.8 g. (0.1 mol.) of 4-chloro-3-nitroquinoline are added to the stirred solution. The mixture is stirred for 2 hours at room temperature, and the separated product is filtered off. 30.6 g. (96 %) of 4-β-phenylacetylhydrazino-3-nitroquinoline are obtained; m.p.: 199°–200 °C.

The following compounds are prepared as described in Examples 1 or 2, respectively:

4-β-formylhydrazino-3-nitroquinoline; m.p.: 190°–191 °C,

4-β-acetylhydrazino-3-nitroquinoline; m.p.: 194°–195 °C,

4-β-nicotinoylhydrazino-3-nitroquinoline; m.p.: 243 °C,

4-β-salicylic hydrazino-3-nitroquinoline; m.p.: 206°–208 °C,

4-β-(p-nitrobenzhydrazino)-3-nitroquinoline; m.p.: 230°–231 °C,

4-β-(3', 4', 5'-trimethoxybenzhydrazino)-3-nitroquinoline, m.p.: 213°–215 °C,

4-β-(3', 4'-dimethoxyphenacetylhydrazino)-3-nitroquinoline, m.p.: 168°–170 °C,

4-β-(p-bromobenzhydrazino)-3-nitroquinoline; m.p.: 219°–221°C.

EXAMPLE 3

2.04 g. (0.01 mol.) of 4-hydrazino-3-nitroquinoline are dissolved in 20 ml. of pyridine, and 1.4 g. (0.01 mol.) of benzoylchloride are added dropwise to the stirred solution. The reaction mixture is boiled for one hour, thereafter it is cooled and poured onto water. 4-β-Benzhydrazino-3-nitroquinoline, a product identical to that prepared in Example 1, is obtained.

EXAMPLE 4

3-Amino-4-β-benzhydrazinoquinoline 6.2 g. (0.02 mol.) of 4-β-benzhydrazino-3-nitroquinoline are hydrogenated in an ethanolic medium, in the presence of palladium catalyst. When the hydrogen uptake ceases, the mixture is filtered, and the filtrate is evaporated. 4.6 g. (83 %) of 3-amino-4-β-benzhydrazinoquinoline are obtained; m.p.: 192°–193 °C.

EXAMPLE 5

3-Phenyl-1,2-dihydro-as-triazino[5,6-c]quinoline hydrochloride 5.6 g. (0.02 mol.) of 3-amino-4-β-benzhydrazinoquinoline are boiled for 1 hour in 50 ml. of 20 % ethanolic hydrochloric acid, and the separated dark violet crystals are filtered off. 5.9 g. (98 %) of 3-phenyl-1,2-dihydro-as-triazino[5,6-c]quinoline hydrochloride are obtained; m.p.: 297°–298 °C.

Similarly are prepared the following compounds:

1,2-dihydro-as-triazino[5,6-c]quinoline hydrochloride; m.p.: 285°–287 °C, 3-methyl-1,2-dihydro-as-triazino[5,6-c]quinoline hydrochloride; m.p.: 301°–303 °C, 3-(p-hydroxyphenyl)-1,2-dihydro-as-triazino[5,6-c]quinoline-hydrochloride; m.p.: 312°–313 °C, 3-(p-aminophenyl)-1,2-dihydro-as-triazino[5,6-c]quinoline hydrochloride; m.p.: 308°–310 °C, 3-benzyl-1,2-dihydro-as-triazino[5,6-c]quinoline hydrochloride; m.p.: 296°–298 °C, 3-(4'-pyridyl)-1,2-dihydro-as-triazino[5,6-c]quinoline hydrochloride; m.p. 308°–310 °C, 3-phenyl-1,2-dihydro-as-triazino[5,6-c]quinoline hydrobromide; m.p.: 309°–311 °C.

EXAMPLE 6

6.0 g. (0.02 mol.) of 3-phenyl-1,2-dihydro-as-triazino[5,6-c]quinoline hydrochloride are added to the solution of 13.2 g. (0.04 mol.) of K$_3$Fe(CN)$_6$ in 100 ml. of water at 0 °C. Prior to addition the pH of the solution is adjusted to 9 with concentrated ammonium hydroxide. The reaction mixture is stirred at 0 °C for 3 hours, thereafter the separated substance is filtered off. 5.0 g. (97 %) of 3-phenyl-as-triazon[5,6-c]quinoline are obtained; m.p.: 203°–204 °C (after recrystallization from a mixture of ethanol and chloroform).

Similarly are prepared the following compounds:

as-triazino[5,6-c]quinoline; m.p.: 162°–164 °C,
3-methyl-as-triazino[5,6-c]quinoline; m.p.: 137°–138 °C,
3-ethyl-as-triazino[triazino[5,6-c]quinoline; m.p.: 106°–108 °C,
3-(4'-pyridyl)-as-triazino[5,6-c]quinoline; m.p.: 213°–214°C,
3-benzyl-as-triazino[5,6-c]quinoline; m.p.: 150°–152 °C,
3-(3', 4'-dimethoxybenzyl)-as-triazino[5,6-c]quinoline; m.p.: 150°–152 °C,
3-(3', 4', 5'-trimethoxyphenyl)-as-triazino[5,6-c]quinoline; m.p.: 182°–183 °C,
3-(2'-hydroxyphenyl)-as-triazino[5,6-c]quinoline; m.p.: 246 °C,
3-(4'-aminophenyl)-as-triazino[5,6-c]quinoline; m.p.: 268°–270 °C,
3-(4'-bromophenyl)-as-triazino[5,6-c]quinoline; m.p.: 245°–247 °C.

What we claim is:
1. A 3-substituted as-triazino[5,6-c]quinoline derivative selected from the group consisting of a compound of the formula

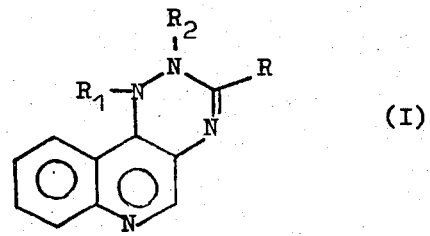

(I)

wherein
R is a member selected from the group consisting of phenyl, halophenyl, hydroxyphenyl, aminophenyl, methoxyphenyl, benzyl, methoxybenzyl and pyridyl;
$R_1$ to $R_2$ are each hydrogen or together form a chemical bond, and a pharmaceutically acceptable acid addition salt thereof.

* * * * *